United States Patent [19]

Chan et al.

[11] Patent Number: 5,222,800
[45] Date of Patent: Jun. 29, 1993

[54] RECESSED LIGHTING FIXTURE

[75] Inventors: Kingsley Chan, Guttenberg; Neil Russo, Howell; Albert L. Newman, West Orange, all of N.J.

[73] Assignee: The Genlyte Group Incorporated, Secaucus, N.J.

[21] Appl. No.: 827,112

[22] Filed: Jan. 28, 1992

[51] Int. Cl.⁵ ............................................. F21S 1/02
[52] U.S. Cl. ..................................... 362/147; 362/365
[58] Field of Search .............. 362/147, 148, 364, 365, 362/366; 174/50 R

[56] References Cited

U.S. PATENT DOCUMENTS

| | | | |
|---|---|---|---|
| 2,802,933 | 8/1957 | Broadwin | 362/366 |
| 3,057,993 | 10/1962 | Gellert | 362/364 |
| 3,082,023 | 3/1963 | Rudolph et al. | 174/65 R |
| 3,313,931 | 4/1967 | Klugman | 362/366 |
| 3,420,995 | 1/1969 | Dunckel | 362/366 |
| 3,700,885 | 10/1972 | Bobrick | 362/366 |
| 3,778,609 | 12/1973 | Liberman | 362/364 |
| 4,471,416 | 9/1984 | Druffel | 362/365 |
| 4,605,816 | 8/1986 | Jorgensen et al. | 174/65 R |
| 4,751,624 | 6/1988 | Russo et al. | 362/364 |
| 4,754,377 | 6/1988 | Wenman et al. | 362/148 |

Primary Examiner—Carroll B. Dority
Attorney, Agent, or Firm—Hopgood, Calimafde, Kalil, Blaustein & Judlowe

[57] ABSTRACT

A lighting fixture having a simplified structure is provided with such benefits as a junction box attached directly to the housing, a full reflector for improved optics, and support means for installation in different ceiling structures. A bulb or lamp is disposed in a socket which is attached to the reflector such that the lamp is disposed entirely within the volume of the reflector. Additionally, the reflector is positionable within the housing, whereby inexact or inaccurate mounting of the housing to the ceiling structure can be corrected by changing the orientation of the reflector. Accordingly, lighting of the environment is not compromised by imprecise mounting of the housing and can be redressed by positioning the reflector as required. The invention also allows the fixture to be moved easily along the support bars connected to the joists even after the bars have been connected.

15 Claims, 10 Drawing Sheets

RECESSED LIGHTING FIXTURE

BACKGROUND OF THE INVENTION

1. Field of the Invention

This invention relates to a recessed lighting fixture that is easier to install, has fewer parts, better optics, and is more readily accessible for adjustment, alteration, and inspection than conventional fixtures. More particularly, this fixture is especially adapted for ceiling installation.

2. The State of the Art

As a brief retrospective of indoor lighting, the standard incandescent light bulb, generally known as an "A-type" bulb, is held in a socket through which electricity is supplied to the bulb. As now typically standardized, the bulb is secured with metal threads on the end of the bulb electrically connecting with the threaded socket. Over time it was appreciated that a naked light bulb was not only unattractive but also inefficient in distributing light; that is, because light radiates essentially spherically from the filament in an A-type bulb, light emanating towards the ceiling is not useful for providing light to the environment. Accordingly, various types of shades, reflectors, and other adapters were devised in combination with the socket in attempts to provide the desired lighting of the environment.

Later developments led to an incandescent bulb having an internal reflector. In essence, a portion of the inside of the bulb is coated with a reflective material so that light from the filament is emitted in one direction and light emitted in the other direction is reflected such that it too emanates in the desired direction. The need for a separate reflector to redirect the light was eliminated by making the bulb into a directional light source. These are commonly known today as R and PAR type bulbs.

Both A-type, PAR, and R types of bulbs are used in ceiling mounted lighting fixtures. The typical ceiling mounted lighting fixture is comprised of a frame with some means for being secured to the structural supports of the ceiling, generally wood joists. In a typical installation where ceiling tiles or gypsum boards form the ceiling structure, the frame of the lighting fixture includes holes or brackets though which fasteners are used to securely position and attach the fixture to the joists supporting the ceiling. In the so-called hung, drop, or suspended ceiling installations, a metal gridwork is suspended in spaced relation to the overhead structure. In this environment, the frame of the lighting fixture is provided with guideways or similar means for interconnection with the grid components for supporting the fixture at a desired position on the grid. With these typical ceiling installations, the installer has access to the structural members from which the ceiling is hung and is readily able to attach the lighting fixture to those structural elements.

Depending upon building codes and architectural needs and desires, the ceiling environment may be insulated or non-insulated (referred to as IC or non-IC, "IC" being an abbreviation for "insulated ceiling"). The design environment determines whether the lighting fixture must be an IC or non-IC type of fixture for electrical and thermal safety considerations. A ceiling that is insulated will retain heat generated by a bulb in the lighting fixture. Accordingly, the fixture and its vicinity can become quite hot. An IC fixture, because it is designed to operate at higher temperatures found in an insulated ceiling, is used in an insulated ceiling and also can be used in a cooler, non-IC environment. A non-IC fixture can be used safely only where insulation is not present.

Another important aspect of the propriety of an IC or non-IC design for the specific lighting fixture application depends upon the bulb used in the fixture. Use of an improper type or wattage of bulb can create hazards, such as a temperature higher than the fixture (and possibly the insulation) is able to accomodate for the specific environment. As will be described in more detail later, conventional lighting fixtures include a partial reflector that obfuscates or otherwise covers the instructions for which type of bulb is appropriate. Unless these instructions are readily visible when changing the bulb, it becomes more likely that one might inadvertently use an improper bulb, creating a potentially dangerous condition with respect to overloading the electrical circuitry and/or a thermal condition creating a fire hazard.

Another aspect of this type of fixture is the cost savings that might be achieved by a minimal design. Ceiling mounted fixtures are very widely used, in virtually every new construction operation, whether for residential or commercial use. Accordingly, significant costs savings may be achieved by reducing the number and/or weight of the components necessary to provide such a fixture.

Yet another problem with prior art devices is caused by the rigidity of the frame. Although the joists or other ceiling structure to which the lighting fixture is attached are intended to be orthogonal with the plane of the ceiling, a slightly sloped ceiling or installation of the device at a slight slope will prevent the optics from being as desired. The prior art fixtures have a rigid, unchangeable geometry, and so must be mounted with particular care towards their relationship to the ceiling; such customized installation is rare and somewhat contrary to the intended use of mass-produced, easily installed lighting fixtures.

In essence, prior art devices have a number of deficiencies regarding safey and cost of manufacturing. A simpler or more efficient fixture design would not only facilitate installation, but likely would also save manufacturing costs by reducing the number of individual component parts and/or the weight of materials used.

SUMMARY OF THE INVENTION

Accordingly, it is an object of this invention to provide a ceiling mounted lighting fixture that is easy to install.

Another object of this invention is to provide a lighting fixture having improved optics and to avoid optics which are compromised due to the installation procedure. A more specific object of the present invention is to provide the desired optics even where the fixture is not installed parallel with the ceiling, or where the ceiling has a slight slope.

Yet another object of this invention is to provide a fixture having a reduced number of parts, resulting in a savings in the cost of construction of the fixture.

Still another object of the invention is to provide a junction box, preferably associated with the novel lighting fixture, that facilitates examination by a building inspector prior to or after the final stages of interior construction.

These and other objects will become apparent upon a perusal of this specificaton.

In general, the present invention provides a lighting fixture comprising a housing, a full reflector, and a lamp socket arranged within the reflector. The inventive fixture preferably also includes a junction box and wiring means. The housing is provided for supporting the lighting fixture. The full reflector is selectively positionable within the housing for reflecting light from the fixture. The socket for accepting a light bulb is selectively attachable to the full reflector and operably associated therewith so that a bulb accepted in the socket is disposed within the reflector. In preferred embodiments, a junction box for accepting electrical power is attached directly to the housing. In another preferred embodiment, a pair of support bars are releasably connected with the housing providing for installation by permanent attachment to the ceiling structure.

DETAILED DESCRIPTION OF SPECIFIC EMBODIMENTS

The lighting fixture of the present invention generally includes a housing which accomodates a socket and a full reflector for a bulb disposed within the socket. A bulb disposed in the socket accomodated within the full reflector is provided with proper reflecting optics to the extent that all of the light from the bulb will emanate from the reflector, with virtually none being lost. Another aspect of lighting optics, the spatial relationship between the fixture and the environment to be illuminated, is assumed to be near optimal if the room walls, floor, and ceiling all form an essentially perfect box. Because actual conditions are usually suboptimal, the reflector of this invention is separately positionable and/or rotatable within the housing, thereby allowing for the lighting of the environment as intended regardless of the structure of the ceiling. The novel lighting assembly of this invention may also include a junction box mounted directly to the housing for safeguarding electrical connections between the fixture and an external power supply. The present fixture may also include means for mounting the housing to the supporting structure of a ceiling, preferrably by using support bars releasably coupled directly to the housing and permanently attachable to joists for selectively and securely mounting the housing.

Figure 1:
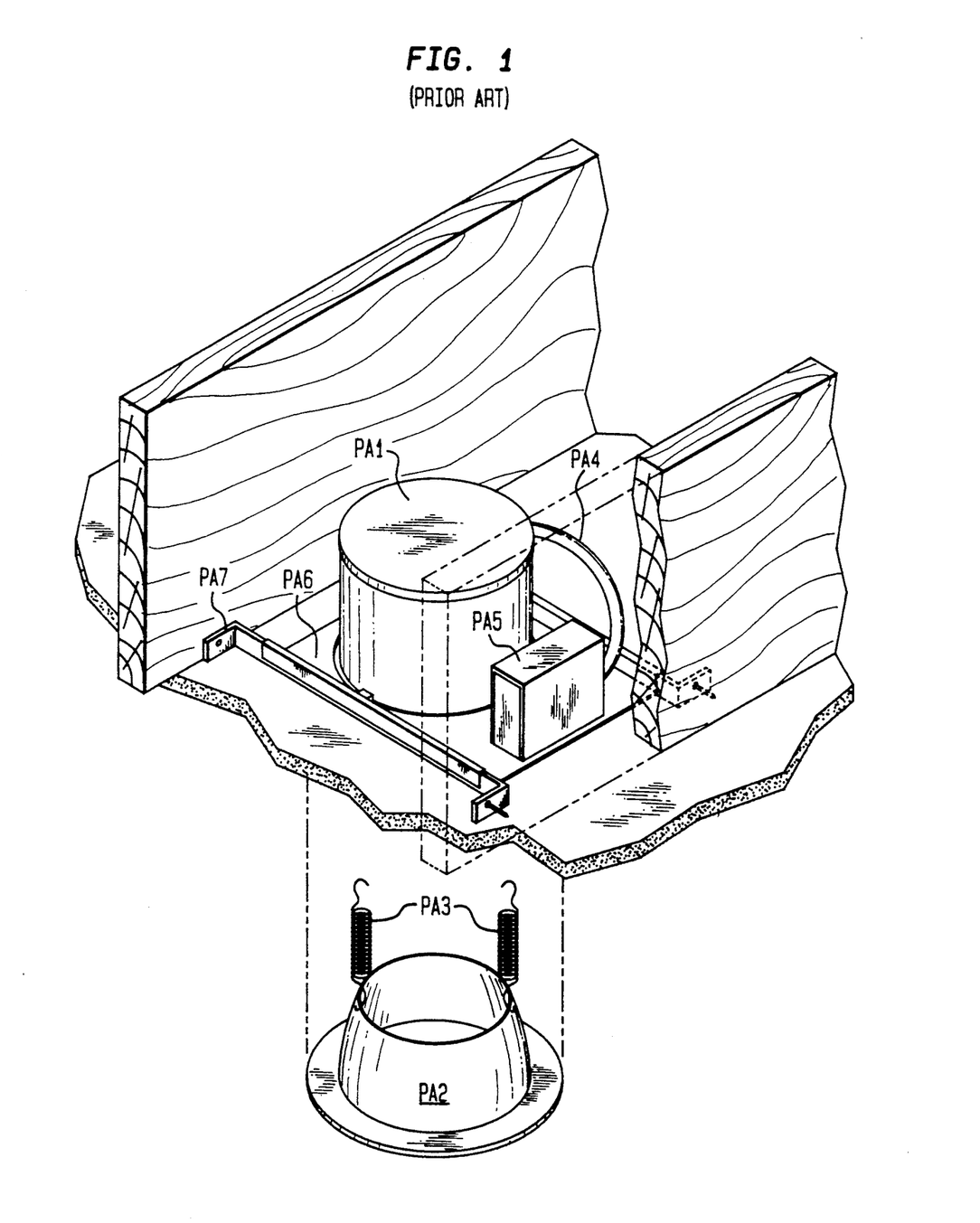
FIG. 1 depicts a perspective view of a prior art lighting fixture.

In order to gain an appreciation for the advantages of the inventive fixture over the prior art, an understanding of the prior art devices may be gained with reference to FIG. 1. As mentioned in the Background section, prior art devices generally comprise a housing PA1 defining an aperature and having a socket at the housing end opposite the aperture. To improve the illumination qualities of the fixture, the prior art utilizes a partial reflector PA2 which attaches to the housing within the aperature by means of helical springs PA3. The socket is connected by wiring PA4 to a junction box PA5 in which a splice to extenal wiring is housed (not shown). Both the housing and the junction box are supported by a common frame PA6 which is connected by supports PA7 that span the joists of the ceiling structure. The prior art thus requires a significant amount of frame material to secure the fixture to the ceiling structure and to support the junction box. The excessive material used to provide the prior art frame significantly increases material costs and thus also increases the cost of the fixture. The prior art also requires that the socket be fixedly positioned with respect to the housing. Although some improvement in optics is achieved with the partial reflector PA2, the optics are easily compromised by imprecise installation due to the general rigidity of the fixture. Attachment of the partial reflector is also somewhat cumbersome because there is limited clearance for the helical springs to be attached within the housing by hand.

Figure 2:
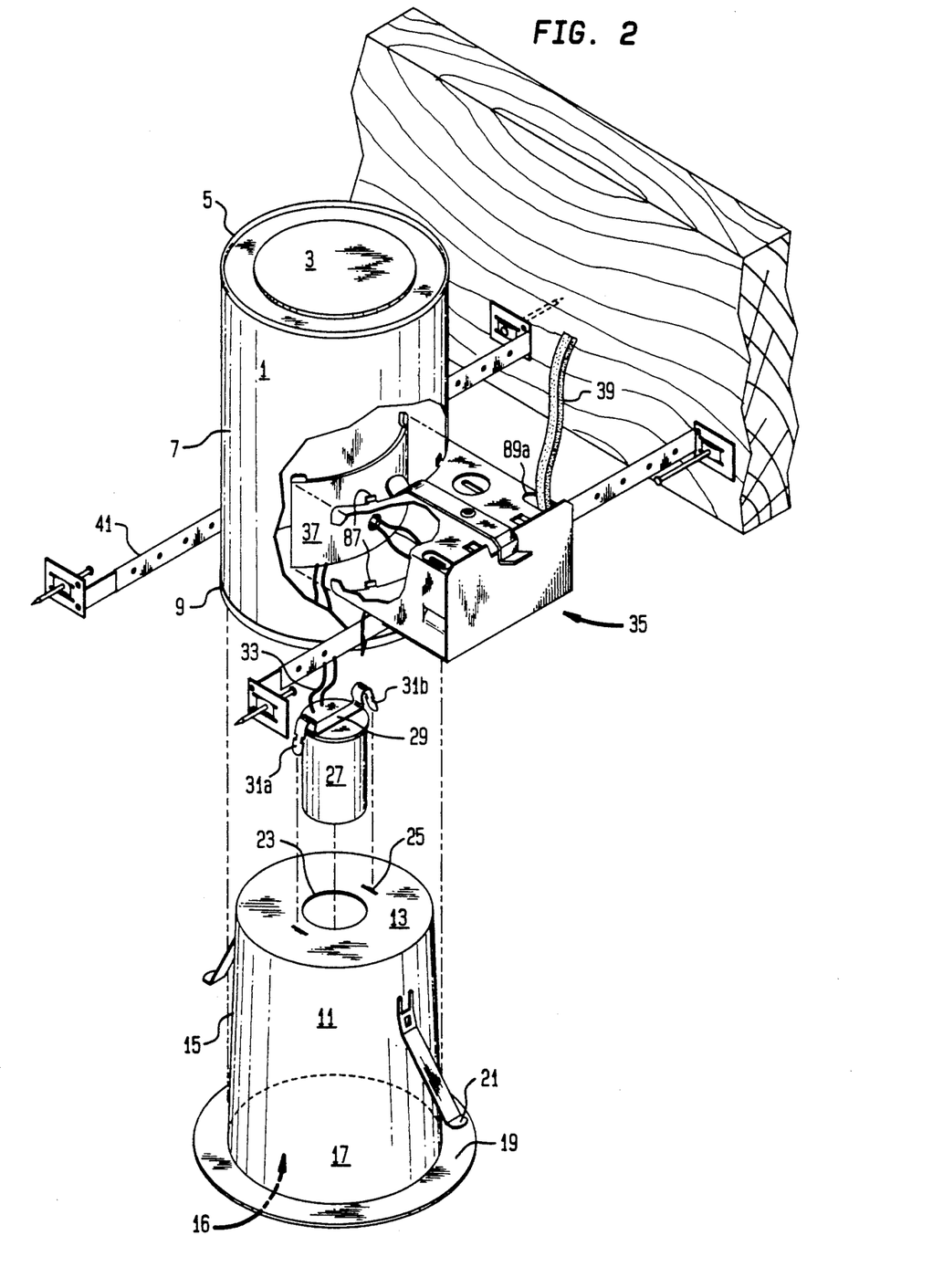
FIG. 2 is a partially exploded perspective view of the novel fixture showing the housing, junction box, socket, reflector, and support bars.

In contrast, the present lighting assembly, as illustrated in FIG. 2, comprises generally a housing 1 having disposable and positionable therein a full reflector 11. A socket 27 is attached directedly to the full reflector 11 and the socket and reflector are operably associated such that a bulb disposed in the socket is accurately contained within the reflector. Attached directly to the housing 1 is a junction box 35 for electrical connections between the socket 27 and an external power source. Thus, the socket, reflector, and junction box can all be connected to the housing such that an integral assembly is created. Lastly, this integrated assembly can be attached to the ceiling structure by a pair of support bars 41 which also are connected to the housing by leaf springs.

In further detail with reference to FIG. 2, the lighting assembly comprises a fixture housing 1 having a top portion 3 attached at a top rim 5 to a housing wall(s) 7. Thus, a non-cylindrical geometry for the housing may have more than one housing wall, whereas the preferred cylindrical geometry shown will provide a housing having only a single, continuous side wall. The housing wall terminates at a bottom rim 9. The top rim 5 is preferably made by rolling the top portion 3 over onto the housing wall 7, as in a conventional can used for food packaging. Likewise, the bottom rim 9 is preferably provided by rolling the wall 7 back onto itself, thereby eliminating sharp edges that could injure the person installing the fixture or could damage wiring insulation.

The inventive lighting assembly includes, disposed within the housing 1, a full reflector 1, which includes a reflector top 3 and at least one depending reflector wall 15 defining an internal reflector volume 16. The reflector wall 15 defines an aperature 17 through which light emanates. At the portion of the refector wall 15 defining the aperature 17 is a reflector trim 19 disposed generally orthogonally to the reflector wall. Disposed on the outside of the reflector wall (as opposed to the interior volume 16) is at least one reflector retaining spring 21, although multiple springs can also be used. Preferably the retaining spring 21 includes multiple leaf springs disposed symmetrically or equidistantly around the reflector wall. The leaf-type reflector retaining springs shown in the Figures abut the interior of the housing wall to selectively secure the reflector within the fixture housing. Additionally, the springs allow the reflector to be disposed at various desired axial depths within the cylindrical housing and/or at various orientations angled from the axial extent of the housing (axial being essentially along the axis of the cylindrical reflector). Other suitable means for selectively securing the full reflector can include a non-conductive, close fitting ring or annulus arranged on the outside of the reflector wall having a geometry effective to frictionally engage both the full reflector and the inside of the housing.

The novel lighting assembly also includes a socket 27 adapted for receiving a lamp or light bulb. Disposed in the reflector top 13 are a socket receptical 23, shown as a circular opening, and attachment slots 25. The attachment slots are for attaching a socket 27 to the reflector. The socket shown includes a socket clip 29 having two ends which terminate respectively at socket tabs 31a and 31b. The socket tabs 31a/b are operably associated with the attachment slots 25 in the reflector top. The cylindrical socket 27 is thus adapted to fit within the circular socket receptical 23, the combination of the slot and tabs being a preferred means of attaching releasably the socket to the reflector. Other mean for attaching the socket to the reflector may be utilized, the preferred means being those which allow releasable rather than fixed attachment of the socket to the reflector. The embodiment shown facilitates socket attachment to and removal from the reflector by manipulation of the socket tabs from within the reflector volume 16, thereby also facilitating removal and/or replacement of the reflector. The socket can be of any conventional design desired depending upon the type of bulb needed for interior lighting; while the typical socket will allow screwable attachment of a bulb, a socket suitable for compact fluorescent or halogen bulbs may be preferred for certain applications. Thus, the socket is releasably attached to the reflector and the reflector is releasably attached to the fixture housing; friction between the leaf retaining springs and housing is the preferred mode of retaining the reflector not only within the housing but also in a desired position within the housing.

As shown in FIG. 2, issuing from the socket is wiring 33 passing to junction box 35 through a junction box back plate 37 where the wiring 33 is spliced to external wiring 39, such as a BX or ROMEX cable for connection to centralized wiring (not shown). The junction box is preferably attached directly to the fixture housing.

Figure 3:
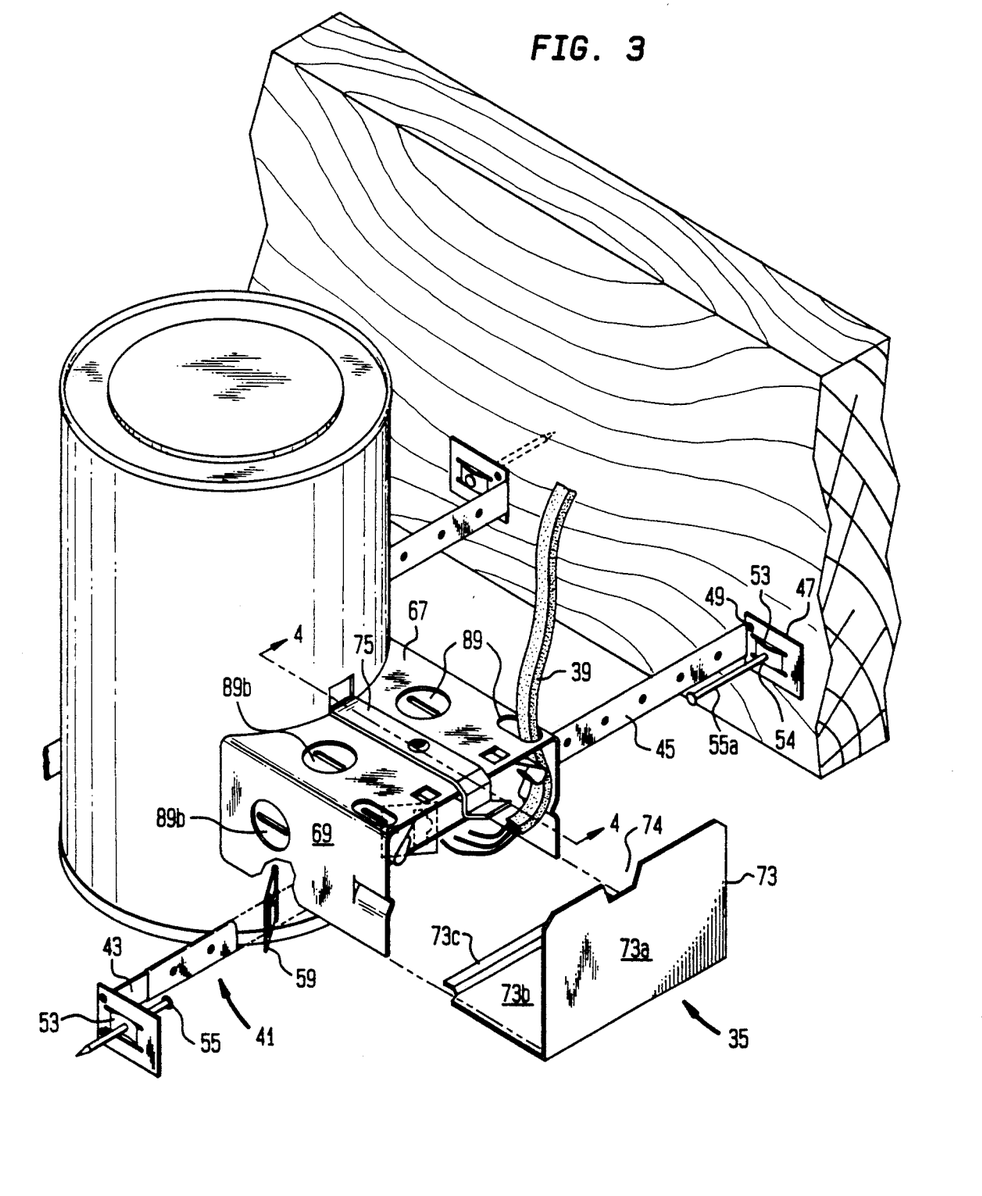
FIG. 3 depicts a perspective view of the housing, supporting structure, and junction box arranged in an assembled configuation.

The novel assembly having a reflector, socket, and junction box integrated with and supported by the housing is mounted to a ceiling structure. As shown in the Figures, the housing 1 is secured to a ceiling structure such as spaced apart joists by support bars 41. The support bars are attached directly to the housing by means of springs, without any intervening frame as required by the prior art. As variously shown in FIGS. 2, 3, 8, 9, and 10, each support bar 41 has a tongue portion 43 and a groove portion 45 which slidably cooperate to provide a support bar of a length adjustable as necessary for attachment to the ceiling structure. Each end of the support bar includes a flange 47 for direct attachment to the ceiling structure. One means of such direct attachment can be by nailing through nail holes 49 which are strategically provided through the flange 47 and/or by nailing a nail tab 51 integral with the flange into the joist. An especially preferred embodiment of the flange, as shown in FIG. 3, includes a retaining nail bridge 53 having a hole 54 with a diameter smaller than the diameter of nail 55, whereby nail 55 can be pressure-fit into the hole and held as shown at 55a. This design facilitates attachment by providing the device with a nail strategically positioned where desired without the person installing the fixture having to use another hand to locate and then hold a nail in place; that is, the bars are manufactured with a nail positioned in each flange. Preferably, the retaining nail bridge 53 is bowed towards the support bar to provide a recess in which the tip of the nail resides until the nail is hammered; accordingly, the installer is also protected from the sharp nail tip during installation. The curved nail bridge also facilitates pulling out the nail, if required, by positioning the nail head for engagement with the claw of a hammer. The tongue-and-channel construction of the support bars provides increased strength and variable length without adding additional material. The support bars may also adapted for attachment to ceiling runners as described in U.S. Pat. No. 5,045,985, incorporated herein by reference.

The channel portion 45 of the support bar includes a plurality of equally spaced holes 57, and the side of the tongue adjacent the holes preferably has a nub (not shown) which frictionally engages the holes to prevent the tongue 43 and channel 45 portions from sliding apart without manipulation by the installer. The cooperation of the nub with the spaced holes provides a self-locking arrangment for the bars. Thus, the tongue and channel portions of the support bar may be slideably positioned in discrete or continuous lengths.

Figure 10:
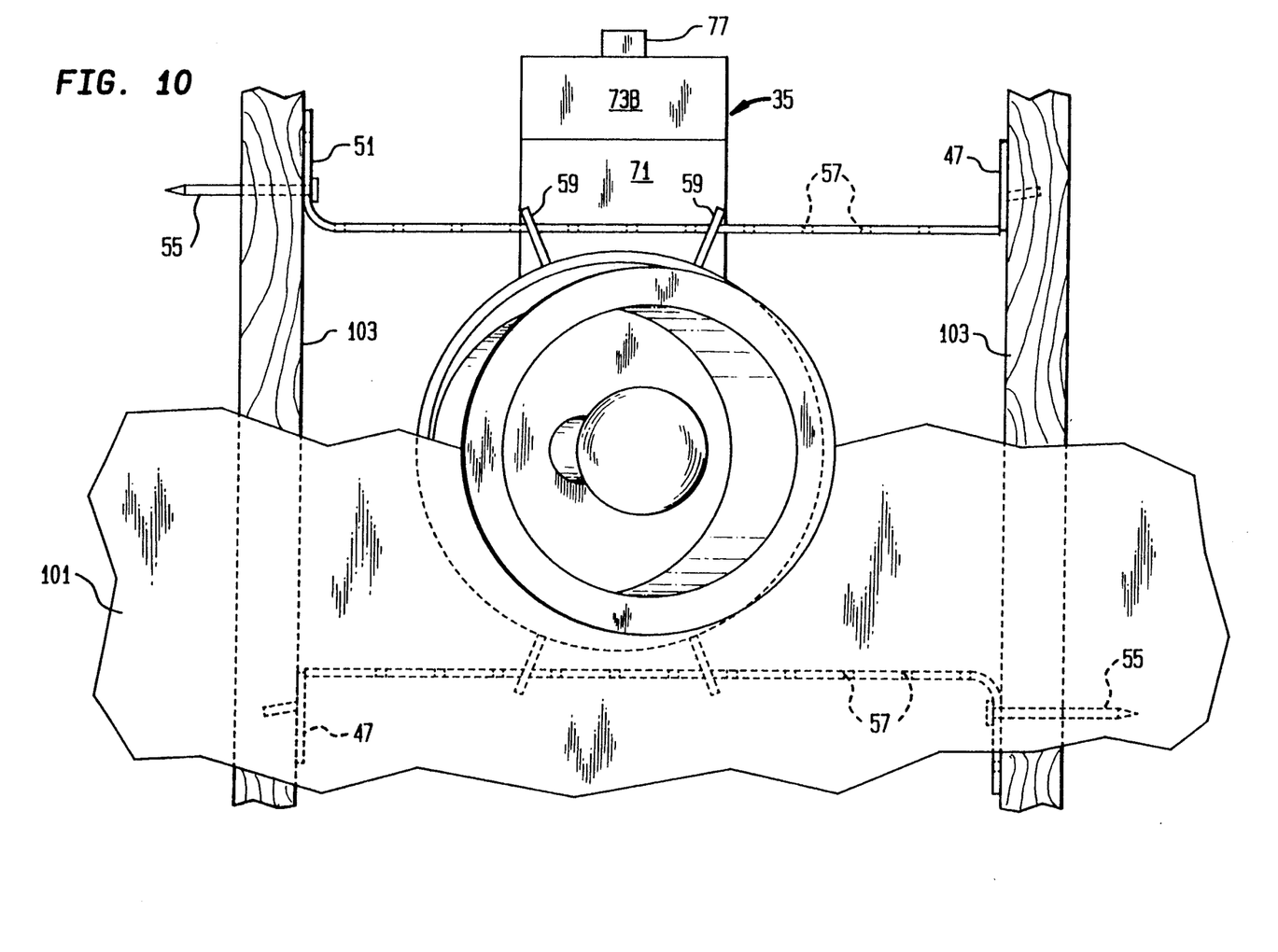
FIG. 10 depicts a view from underneath an installed fixture showing how the housing orientation can vary while the optics remain the same; this view also depicts another method of attaching the housing to the ceiling structure.

The spaced holes 57 in the channel portion of the support bar 41 can be used to provide a support composed of only the channel portion disposed between joists that are spaced closely together, for example, closer than when the support bar is slideably contracted to its smallest length. Each spaced hole in the channel portion acts as a score point at which the channel portion can be bent to accomodate the closer spacing of the joists. The channel portion is bent with the resulting bent portion being position flush with the joist. The spaced holes on the bent portion function as nail holes for securing the support bar. Thus, as shown in FIG. 10, the supporting means is effectively only the channel portion of the support bar, which is bent as shown to provide a bar of the desired length. A nail 55 can be hammered through the hole 57 to secure the bar at the bent portion of the channel, and securement at the other end can be accomplished using the flange structure provided, for example, by using the nail tab 51.

Figure 4:
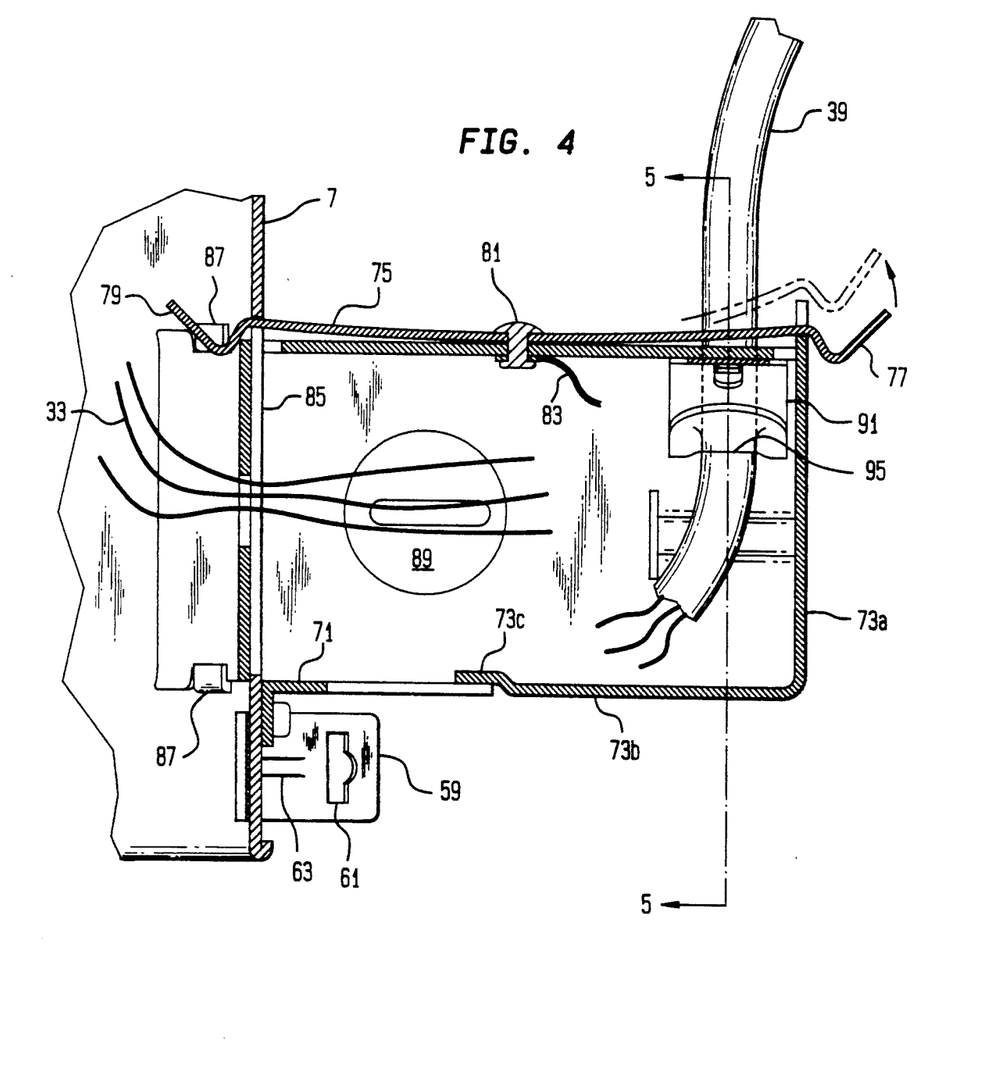
FIG. 4 depicts a cross-sectional view of the junction box transverse to the housing taken along line 4—4 of FIG. 3.
Figure 5:
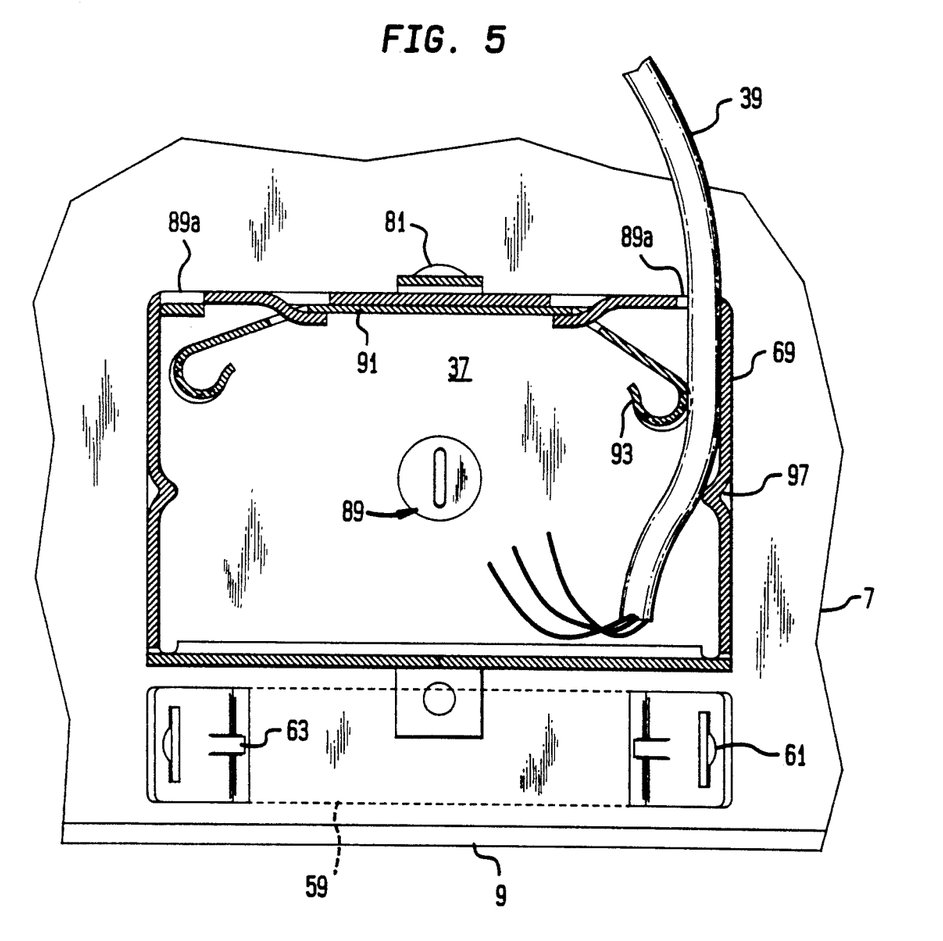
FIG. 5 depicts a cross-sectional view of the junction box essentially parallel with the extent of the housing taken along line 5—5 of FIG. 4.
Figures 8, 9:
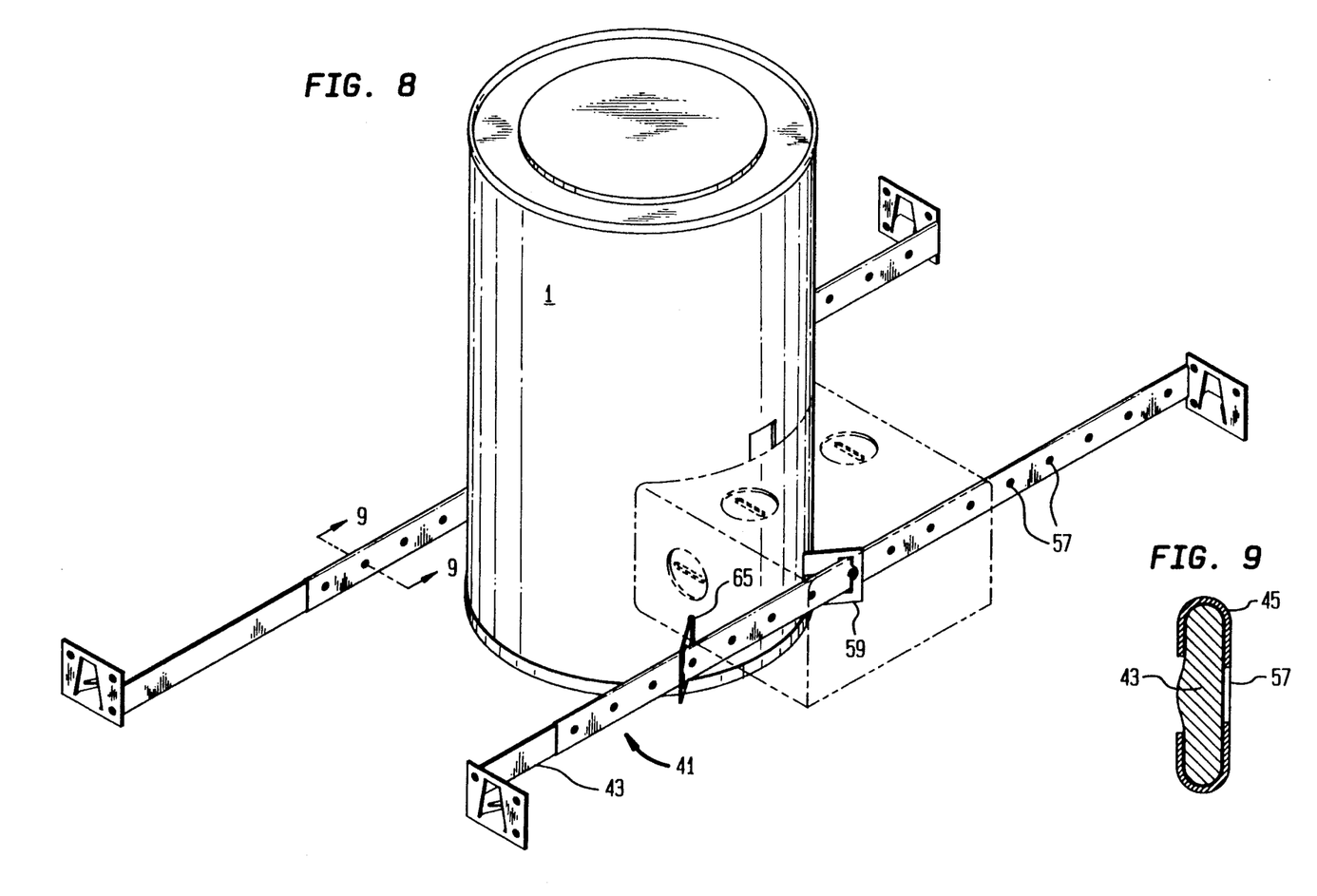
FIG. 8 depicts a perspective view of another embodiment of the housing and the support bars.
FIG. 9 depicts a cross-sectional view through one of the support bars along line 9—9 as shown in FIG. 8.

As shown in FIGS. 3, 4, 5, and 8, each support bar 41 is attached to the housing 1 by a retaining clip 59, preferably a symmetrical leaf having a support bar passage 61 in each end. The support bar 41 passes through both passages 61 of the clip 59, as shown in FIG. 8. Referring also to FIGS. 4 and 5, proximate from each passage is a securement tab 63, generally a tongue stamped out from the clip. The retaining clip 59 is sliped through the pair of clip passages 65 in the housing wall 7. As shown, a single clip can be positioned through the pair of clip passages and the securement tabs 63 bent towards or away from each other (i.e., out of the plane of the clip) to engage the housing, thereby securing the clip to the housing by preventing the clip from being slid through either clip passage. The retaining clip instead may be fixedly attached to the housing wall by a rivet, although this would require more material and an additional manufacturing operation. The retaining clip is essentially a type of leaf spring which frictionally engages and retains the support bar in a desired position. In operation, the ends of the clip where the passages are located are pressed towards each other to release the frictional engagement (by bringing the passages 61 into alignment) and to allow the support bar to be slidably positioned in the passages. The ends of the clip are then released to frictionally re-engage the support bar. Additional strength is provided to the general support structure by arranging the support bar and the retaining clip so that the flat surface of the tongue and channel portions is colinear with the downward force of the fixture; that is, the weight of the lighting fixture is supported by the thicker portion of the support bar rather than normal to the flat surface.

Turning to FIGS. 3, 4, and 5, the junction box 35 includes a top portion 67, depending sides 69, a bottom portion 71, and a door 73. The junction box door 73 includes a door outer side 73a attached essentially orthogonally to a door bottom side 73b. A tongue 73c extends slightly upwardly from the door bottom side 73b and cooperates with the junction box bottom portion 71 to secure the junction box door.

The L-shaped junction box door 73 includes a clip recess 74 for cooperation with a junction box clip 75 disposed on the top portion 67 of the junction box 35; the junction box clip 75 is for securing both the junction box door 73 and the junction box back panel 37. The junction box clip includes two ends, each configured as a retainer to provide a clip or snapping engagement with the door via clip retainer 77 or with the back panel via clip retainer 79. In the embodiment shown, the junction box door includes clip recess 74 for engaging the retainer and the back panel does not include a similar recess; the presence or absence of a recess to facilitate cooperation with the clip retainer is a design choice. The juction box clip preferably is secured by a rivet 81, at which point of attachment a ground wire 83 is preferably connected with the junction box. The junction box is connected to the fixture housing at the junction box passage 85, an opening in the housing wall designed to accomodate the junction box. As shown in FIGS. 2 and 4, the junction box is held adjacent the fixture housing by the junction box retaining tabs 87 which extend into the housing and frictionally engage the edges of the junction box passage 85 formed by the housing wall 7.

In various places on the junction box top, side walls, and bottom are disposed pop-out wiring conduits 89 through which wiring can enter and leave the junction box. As shown, these wiring conduits have a longitudal hole to facilitate pop-out by use of a screw driver. In a preferred embodiment, a pair of wiring conduits 89a disposed on the top near the junction box door provide easy access to a wiring clip 91 attached to the junction box top and disposed in the interior the junction box. This wiring clip is likewise preferably a leaf spring having a terminus 93 at the end of each leaf. Each terminus 93 of the leaf spring is preferable curled to avoid damage to the external wiring insulation. The curled end of leaf spring can be used to unlock external wire with a screw driver blade and twisting contour clockwise. The wiring clip 91 is designed to secure the external wiring within the junction box 35 by frictionally abutting the wiring between the terminus and the side wall. The wiring clip 91 preferably also has a cable channel 95, a central depression along the axial extent of the leaf spring, in which the external wiring 39 can reside, maintaining the secured positioning of the external wiring. Still further, the side wall 69 of the junction box adjacent the conduit 89a includes a retaining ridge 97 which extends into the interior of the junction box. The combination of the leaf spring terminus 93 and the retaining ridge 97 provides a non-linear path in which the external wiring is frictionally held, thereby further securing the wiring.

Figure 6:
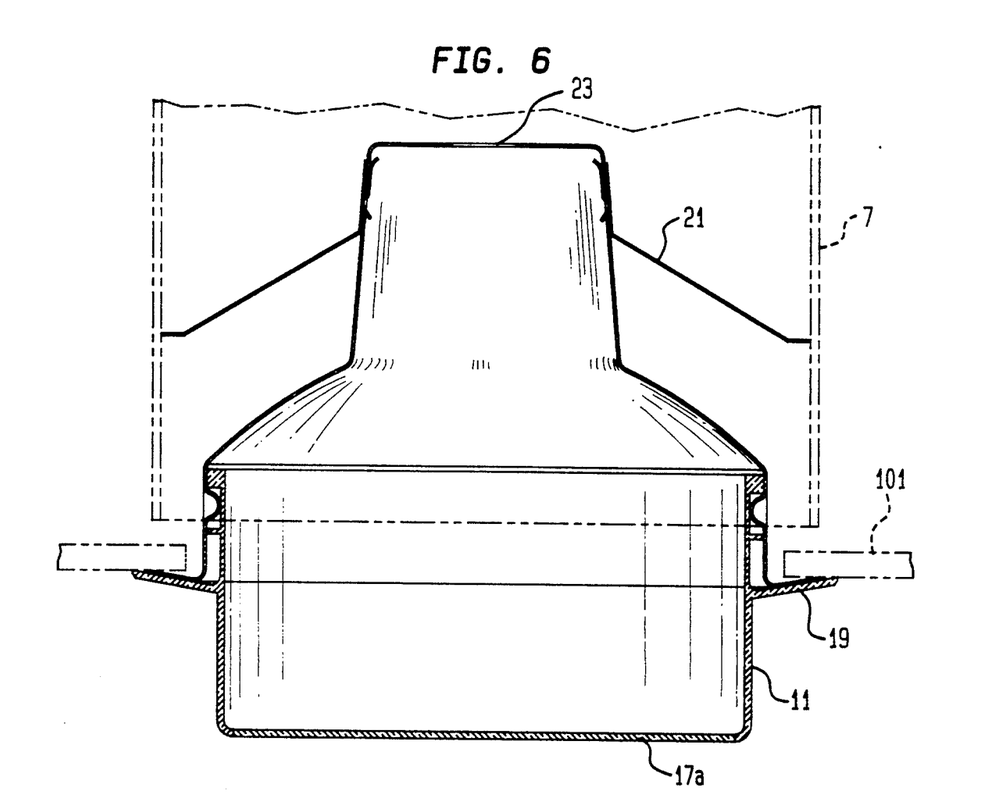
FIGS. 6 and 7 depict cross-sectional views of two different types of reflector geometries suitable for use in the lighting fixture of the present invention; the housing and ceiling are shown as phantoms.
Figure 7:
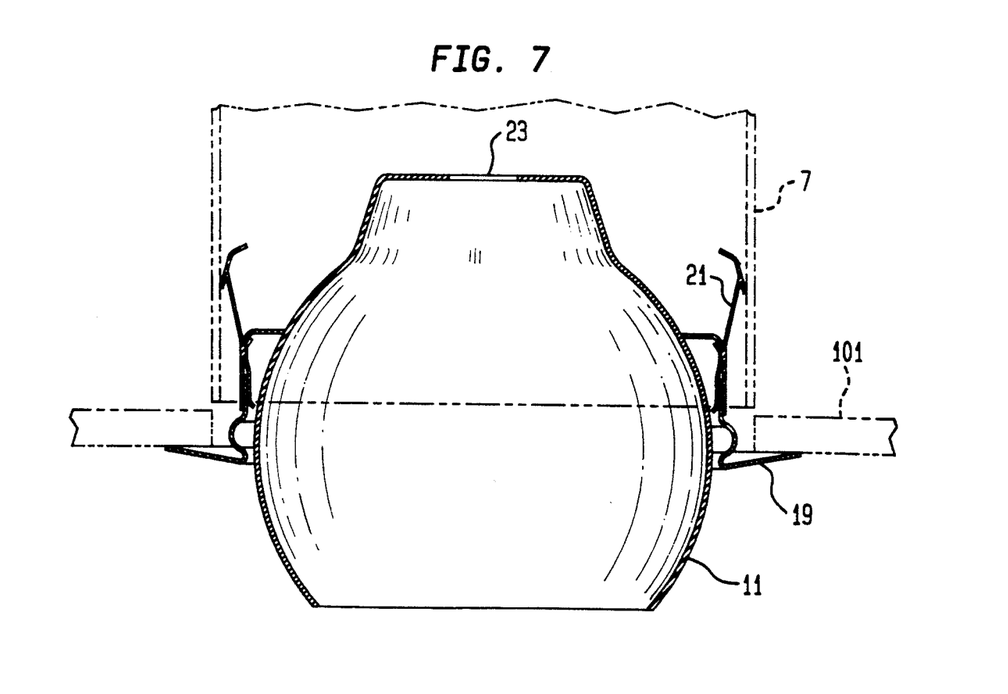

The inventive fixture is especially adapted for using replaceable reflectors. That is, using the same fixture housing, junction box, socket, and support bars, any of a variety of reflector designs and optics can be used to complete the device for the desired interior decor. For example, FIGS. 6 and 7 depict cross-sectional views of two such reflectors. As shown, the full reflector 11 is secured within the housing by friction of the retaining springs 21 against the housing wall 7. The reflector is positioned vertically within the housing such that the trim 19 engages the ceiling 101. These Figures also show how the optics of the present invention are improved over the prior art: whereas the trim 19 was necessary in the prior art to prevent light leakage, in the present invention the trim functions to provide an aesthetically pleasing boundary from the reflector to the ceiling; because of the association between the socket and the reflector that presents the bulb entirely within the reflector, the trim for the present reflectors need not also function to occlude light.

Figure 11A:
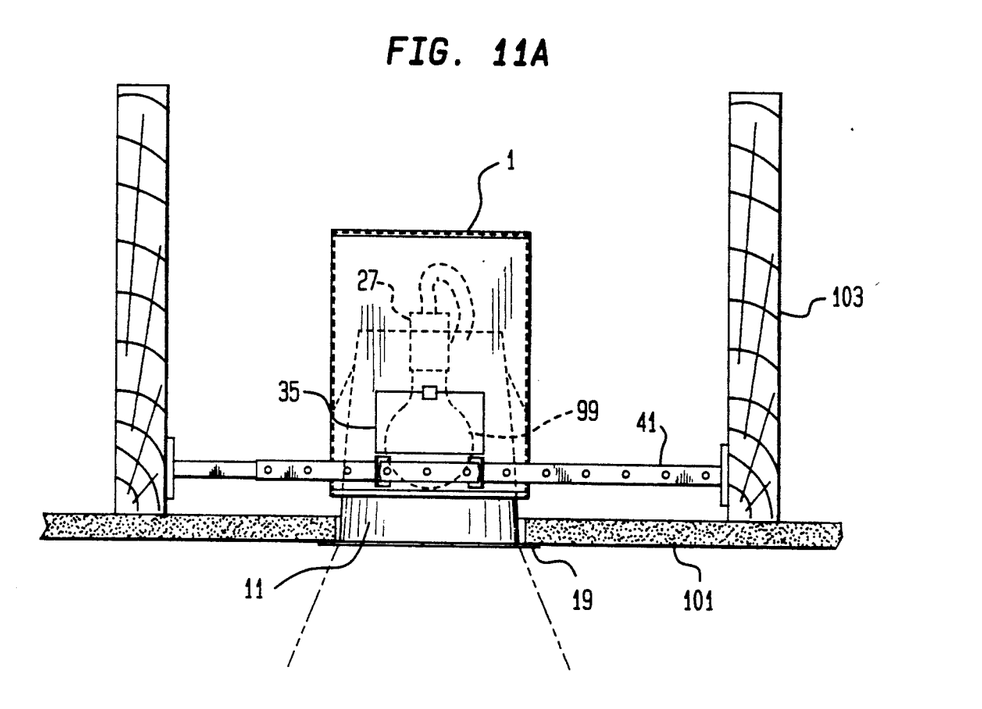
FIGS. 11A-B depict cross-sectional views of the inventive fixture as installed in a ceiling, while FIGS. 11C14 D depict the respective views from underneath the fixtures depicted in FIGS. 11A14 B.

An installed embodiment of the present invention with a phantom light bulb 99 is shown in FIG. 11A, wherein the housing 1 is mounted within the ceiling 101 to joists 103 by the support bars 41. The junction box 35 is attached directly to the outside of the housing. Disposed within the housing is a full reflector 11 having opposite the aperature a socket 27 with the light bulb 99 disposed in the socket. Certain advantages of the present invention now become apparent.

One advantage of the invention is the absence of a rigid supporting frame PA6 between the joists, thereby providing for a means for supporting the fixture with less material. Further, the present supporting means, by not being of a rigid, unadjustable geometry, can be conformed to the spatial orientation of the ceiling structure. Attachment of the junction box directly to the fixture housing also facilitates elimination of the rigid support frame and saves significant material costs by elimination of the frame.

Figure 11B:
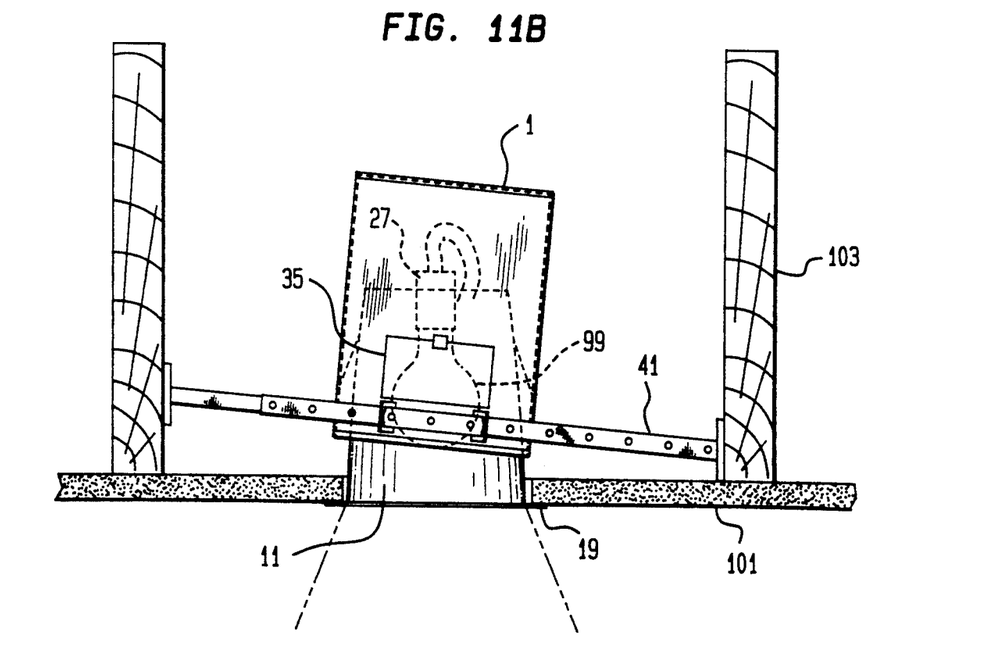

The use of a full reflector 11 in cooperation with a socket 27 which allows the bulb to be disposed within the total reflector provides significant advantages with respect to optics. Use of the partial reflector PA2 as described by the prior art has a number of disadvantages. The partial reflector allows light to leak behind the reflector wall within the housing and appear to the observer in the environment to be leaking out from around the reflector trim; of there is no reflector trim, the partial reflector appears to have a light ring or halo. One method for avoiding this light leakage is to maintain the sides of the reflector above the bulb, but such a solution would increase material costs by creating a double wall comprised of the housing and the partial reflector; such a design would also prevent the reflector from being angularly position in the housing because of the close cooperation between the reflector walls and the housing walls. Rather, the full reflector of the present invention in which the bulb is completely disposed not only avoids light leakage, but maintains optimum optics even during non-optimal installation. For example, as shown in FIG. 11B, the device is not installed such that the support bars are essentially parallel with the ceiling, and thus the housing is not parallel with the ceiling; the inventive fixture is secured between the joists, but the housing is thus disposed at an angle to the ceiling. The novel use of a total reflector that can be positioned variably (both angularly and axially) within the housing allows the reflector to be installed with the optics in the proper orientation even though the housing is in a different orientation. Thus, as shown in FIG. 11B, the full reflector 11 and trim 19 are disposed flush with the ceiling 101 even though the remainder of the fixture (the housing and support bars) is disposed fixedly at a different orientation with respect to the ceiling. The ability of the reflector to be positioned at a desired depth within the housing and to be disposed at some angle different from the axial extent of the housing virtually insure that the optics originally desired for optimal lighting of the environment can be provided regardless of sub-optimal installation of the housing.

Figure 11C:
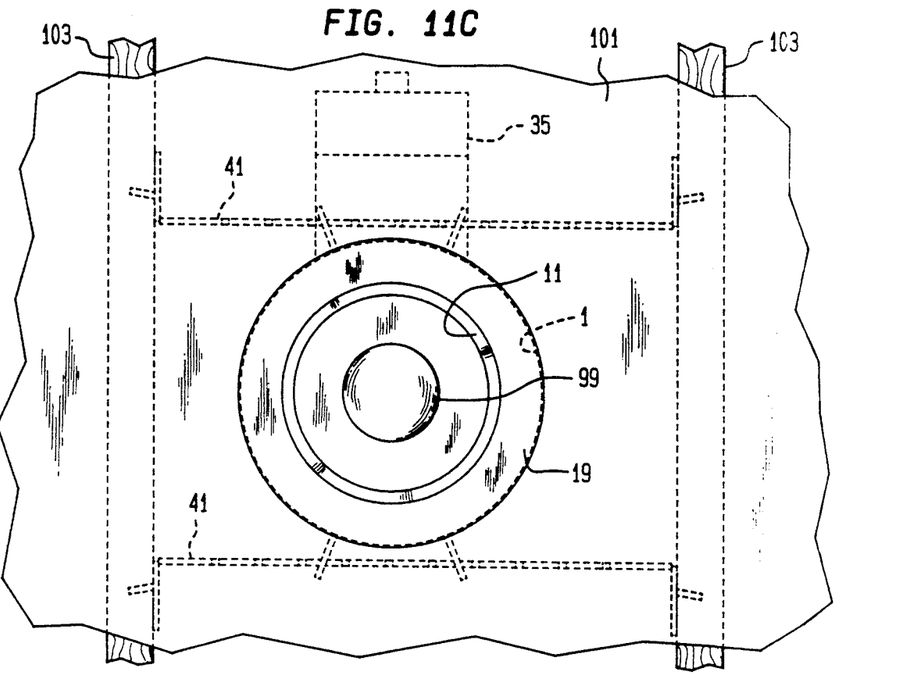
Figure 11D:
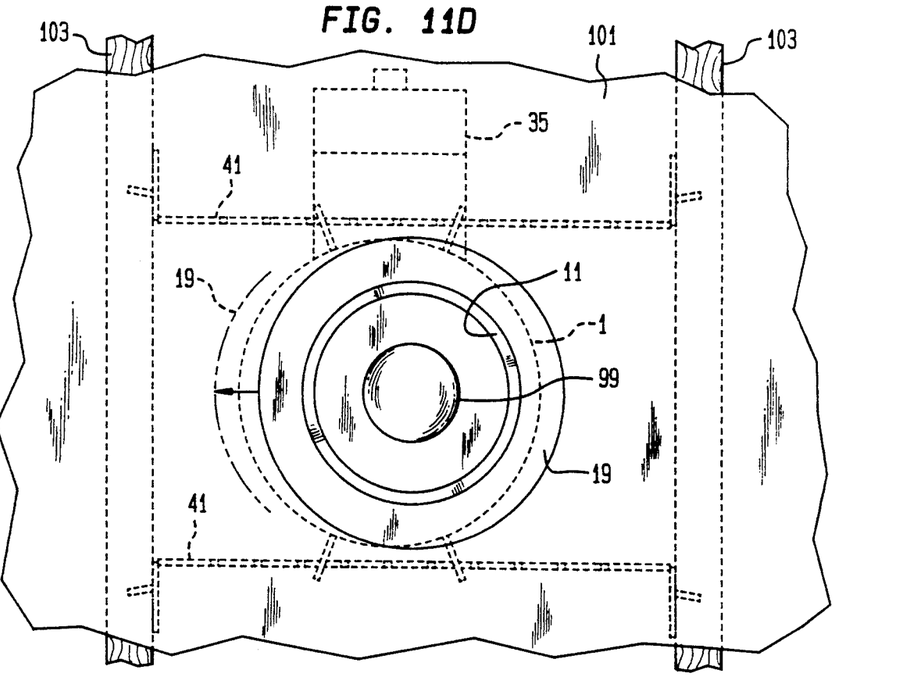

FIGS. 11C and 11D correspond respectively to views from below the installed fixtures shown in FIGS. 11A and 11B; the view shown in FIG. 10 is analogous to that shown in FIG. 11D. The views shown in FIGS. 11A/C depict an optimal installation with the housing and reflector essentially orthogonal to the ceiling structure. In contrast, FIGS. 11B/D show the housing mounted non-orthogonally to the ceiling, but with the reflector positionable orthogonally to the ceiling. Thus, these views show the reflector misaligned with the housing but in the position desired to provide the designed lighting. Prior art housings cannot accomodate being installed non-orthogonally to the ceiling and thus must be removed and reinstalled, or are left as installed to provide sub-optimal lighting and an unaesthetic appearance.

The inventive device can be installed as follows. The support bars are secured to the housing by the retaining clips and are extended/contracted to be of approximately the same length as the distance between the joists where the fixture is to be mounted. The fixture is then mounted between the joists by fixably attaching the support bars at their flanges to the joists by nailing or using the nail tab. External wiring is introduced into the junction box through a conduit and preferably is held by the wiring clip. A splice is made in the junction box between the external wiring and the wiring to the socket. At this point it is commonplace to allow the socket to hang down through the interior of the housing with a bulb in place to provide "temporary lighting." When it is desired to complete installation, the ceiling panel is positioned, a hole is cut below the aperture defined by the housing, and the panel is installed. The socket is connected to the reflector design desired (after removal of the bulb) and the reflector/socket assemble is positioned by inserting the reflector into the housing so that the retaining springs frictionally engage the housing; the reflector is positioned such that the reflector trim is essentially flush with the ceiling. As mentioned, the reflector can be position at the desired depth and desired angle within the housing to provide desired optics to the environment.

After the lighting fixture is installed, the ceiling structure usually must be at least partially disassembled for examination of the wiring by the building inspector. The present junction box is disposed generally orthogonally to the support bar, so the juction box can be opened without obstruction from any element of the fixture. Further, the junction box is likely to be disposed in an open area of the ceiling structure for easy inspection. Still further, the L-shaped junction box door allows the inspector to view the splicing in the box from below, thereby faciliting inspection and reducing the time needed to disassemble and reassemble the junction box and ceiling structure. As shown in FIG. 10, the junction box is disposed such that it is easily accessible when the ceiling is removed without having to disassemble or unsecure the fixture. Also, as mentioned previously, the junction box door (only the bottom face 73b is shown in this Figure) opens from the bottom, and thus provides easy inspection. Because the junction box back panel 37 is removable, it allows the wiring to be inspected even after the ceiling is complete.

Still another advantage created by the present invention relates to safety. Instructions relating to the type of fixture (IC or non-IC) are usually found on a label adhesively applied to the inside of the housing fixture. The prior art use of a partial reflector that is not selectively removeable from the housing permanently obfuscates these instructions, thereby allowing for the use of an improper bulb and creating possibly dangerous conditions. The selectively removeable full reflector of this invention allows easy access to the indicia listing requirements and usage adhesively applied (usually by the manufacturer) to the inside of the housing for the particular installation.

These and other benefits as well as other modifications of the invention may become apparent to the ordinary artisan, and such are intended to be within the scope and spirit of the invention as defined by the claims.

What is claimed is:

1. A lighting fixture which comprises:
   a housing for supporting said lighting fixture;
   a full reflector selectively and positionably arranged within said housing for reflecting light from said lighting fixture;
   a socket selectively attachable to said full reflector and operably associated therewith for accepting a light bulb so that the light bulb is disposed within said full reflector;
   means for supporting the fixture in a ceiling by attachment to a ceiling structure, said support means including a pair of support bars attached directly to said housing, at least one said support bar including slideably engageable tongue and channel portions, said channel portion including a plurality of equally spaced-apart holes along its extend, and said tongue portion including a nub which cooperates with a hole in the extent of said channel portion to retain said support bar at a desired length.

2. A lighting device which comprises:
a housing for supporting said lighting fixture;
a full reflector selectively and positionably arranged within said housing for reflecting light from said lighting fixture;
a socket selectively attachable to said full reflector and operably associated therewith for accepting a light bulb so that the light bulb is disposed within said full reflector; and
a junction box attached directly to said housing for accepting electrical power from an electrical wiring system, said junction box including a selectively removable L-shaped door.

3. The lighting fixture of claim 1, which further comprises
reflector support means, operably associated with said housing and said full reflector, for adjustably supporting said full reflector within said housing.

4. The lighting fixture of claim 3, wherein said housing has interior side walls, an axial extent, and a housing aperture, wherein said reflector support means comprises flexible leaf springs extending from said full reflector and adapted to engage said interior side walls so that said full reflector is supportable at a desired depth along the axial extent of said housing.

5. The lighting fixture of claim 3, which further comprises
a junction box attached directly to said housing for interconnecting a first set of electrical conductors extending from said socket and a second set of electrical conductors associated with an electrical wiring system.

6. The lighting fixture of claim 5, wherein said junction box further comprises
a top wall, a bottom wall, depending side walls and a removable panel which together define a junction box interior, and
at least one wiring conduit for passing said second set of conductors to said junction box interior.

7. The lighting fixture of claim 6, wherein said junction box further comprises
a wiring clip disposed within said junction box interior, for retaining said electrical conductors in an abutting relationship with one of said depending side walls.

8. The lighting fixture of claim 2, which further comprises
reflector support means, operably associated with said housing and said full reflector, for adjustably supporting said full reflector within said housing.

9. The lighting fixture of claim 8, wherein said housing has an interior housing wall surface and a housing aperture, wherein said reflector support means comprises flexible leaf springs extending from said full reflector and adapted to engage said interior side wall surface so that said full reflector is adjustably supported at a desired axial depth within said housing.

10. The lighting fixture of claim 8, wherein said housing has a housing interior and said junction box has a junction box interior in communication with said housing interior so that a first set of electrical conductors extending from said socket can pass into said junction box interior and be interconnected with a second set of electrical conductors associated with an external power supply and passing into said junction box interior.

11. The lighting fixture of claim 9, wherein said junction box further comprises
a top wall, a bottom wall, depending side walls and a removable panel which together define said junction box interior, and
at least one wiring conduit for passing said second set of electrical conductors to the junction box interior.

12. The lighting fixture of claim 10, wherein said junction box further comprises
a wiring clip disposed within said junction box interior, for retaining said electrical conductors in an abutting relationship with one of said depending side walls.

13. A lighting fixture for recessed installation within a ceiling structure having an external ceiling surface, said lighting fixture comprising:
a housing including at least one housing sidewall, a housing aperture, and an interior housing wall surface defining a housing interior having a longitudinal extend and being accessible through said housing aperture;
an electrical socket adapted to receive a light bulb;
a full reflector having reflector walls and a reflector aperture about which reflector trim is disposed, said reflector walls having a socket receptacle through which said electrical socket is supported so that light produced from said light bulb is reflected off said reflector walls and emanates through said reflector aperture;
reflector support means, operably associated with said full reflector and said interior housing wall surface, for adjustably supporting said full reflector at a desired axial depth along the longitudinal extend of said housing interior so that said reflector trim extends beyond said housing aperture and engages a portion of said external ceiling surface;
a junction box directly attached to said housing side wall and having a junction box interior in communication with said housing interior for passing a first set of electrical conductors from said electrical socket into said junction box interior, said junction box further including
at least one wiring conduit for passing a second set of electrical conductors from an external power supply into said junction box interior, and a removable wall portion providing access to said junction box interior so that said first and second sets of electrical conductors can be electrically interconnected therewithin; and
housing support means for supporting sad housing in a desired installation position within said ceiling structure.

14. The lighting fixture of claim 13, wherein said reflector support means comprises flexible leaf springs extending from said full reflector and engage said interior housing wall surface when said full reflector is supported within said housing interior.

15. The lighting fixture of claim 13, wherein said housing support means comprises a pair of support bars fixedly attachable to a selected portion of said ceiling structure and said housing being slidable along said support bars to said desired installation position within said ceiling structure.

* * * * *